(12) United States Patent
Rice et al.

(10) Patent No.: US 7,533,096 B2
(45) Date of Patent: May 12, 2009

(54) COMPUTER-BASED METHOD FOR FINDING SIMILAR OBJECTS USING A TAXONOMY

(75) Inventors: Julia Elizabeth Rice, Sunnyvale, CA (US); Peter Schwarz, San Jose, CA (US); Yu Deng, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 11/457,069

(22) Filed: Jul. 12, 2006

(65) Prior Publication Data
US 2008/0027929 A1    Jan. 31, 2008

(51) Int. Cl.
*G06F 17/30* (2006.01)
(52) U.S. Cl. .................... 707/7; 707/101; 707/6
(58) Field of Classification Search ......... 707/6
See application file for complete search history.

(56) References Cited

U.S. PATENT DOCUMENTS

| | | | |
|---|---|---|---|
| 6,360,227 B1 * | 3/2002 | Aggarwal et al. | 707/102 |
| 6,446,061 B1 | 9/2002 | Doerre et al. | |
| 6,625,619 B1 | 9/2003 | McClendon et al. | |
| 6,826,568 B2 | 11/2004 | Bernstein et al. | |
| 6,886,010 B2 | 4/2005 | Kostoff | |
| 2003/0050915 A1* | 3/2003 | Allemang et al. | 707/1 |
| 2005/0044089 A1* | 2/2005 | Wu et al. | 707/100 |
| 2005/0050054 A1* | 3/2005 | Clark et al. | 707/100 |
| 2007/0208693 A1* | 9/2007 | Chang et al. | 707/2 |

OTHER PUBLICATIONS

Philip Resnik; "Using Information Content to Evaluate Semantic Similarity in a Taxonomy"; cmp-lg/9511007 Nov. 29, 1995; http://citeseer.ist.psu.edu/resnik95using.html.
Zhibiao Wu; "Verb Semantics and Lexical Selection"; National University of Singapore 1994; http://citeseer.ist.psu.edu/417961.html.
Dekang Lin; "An Information-Theoretic Definition of Similarity"; http://citeseer.ist.psu.edu/95071.html.
James Keller; "Taxonomy-Based Soft Similarity Measures in Bioinformatics" http://docto-si.ugr.es/Programa2003-2005/Curso2004-2005/Seminario/Keller.html.
Haiying Wang et al; "Gene Expression Correlation and Gene Ontology-Based Similarity: An Assessment of Quantitative Relationships"; Proceedings of the 2004 IEEE Symposium on Computational Intelligence in Bioinformatics and Computational Biology (CIBCB'2004) 2004:25-31; http://lhncbc.nlm.nih.gov/lhc/docs/published/2004/pub2004065.pdf.

(Continued)

*Primary Examiner*—Pierre M Vital
*Assistant Examiner*—Sabana Rahman
(74) *Attorney, Agent, or Firm*—IP Authority, LLC; Ramraj Soundararajan; Van Nguy

(57) ABSTRACT

A generalized axiomatic definition of information-theoretic similarity is provided for taxonomies that are structured as directed acyclic graph form which multiple terns may be used to describe an object. The definition is adaptable in the presence of ambiguity, as introduced by an evolving taxonomy or classifiers with imperfect knowledge, and two new similarity measures are introduced based on the definitions. A pragmatic implementation is also provided for similarity measures that arc tightly integrated with an object-relational database and scales to large taxonomies and large datasets.

12 Claims, 4 Drawing Sheets

OTHER PUBLICATIONS

Michael Ashburner et al; "Gene Ontology: Tool for the Unification of Biology"; Nature Genetics; vol. 25; May 2000; http://www.geneontology.org/GO_nature_genetics_2000.pdf.

P.W. Lord et al; "Investigating Semantic Similarity Measures Across the Gene Ontology: The Relationship Between Sequence and Annotation" Bioinformatics; vol. 19, No. 10 2003; 1275-1283; http://bioinformatics.oxfordjournals.org/cgi/reprint/19/10/1275.

Jay J. Jiang et al; "Semantic Similarity Based on Corpus Statistics and Lexical Taxonomy"; Proceedings of International Conference Research on Computational Linguistics (ROCLING X), 1997, Taiwan; http://wortschatz.uni-leipzig.de/~sbordag/aalw05/Referate/03_Assoziationen_BudanitskyResnik/Jiang_Conrath_97.pdf.

A.K. Jain et al; "Data Clustering: A Review"; ACM Computing Surveys, vol. 31, No. 3, Sep. 1999; http://www.cs.rutgers.edu/~mlittman/courses/lightai03/jain99data.pdf.

Richard Freeman et al; "Self-Organising Maps for Hierarchical Tree View Document Clustering Using Contextual Information"; http://images.ee.umist.ac.uk/hujun/pubs/LNCS-24120123.pdf.

Shui-Lung Chuang et al; "Taxonomy Generation for Text Segments: A Practical Web-Based Approach"; ACM Transactions on Information Systems, vol. 23, No. 4, Oct. 2005, pp. 363-396.

* cited by examiner

US 7,533,096 B2

COMPUTER-BASED METHOD FOR FINDING SIMILAR OBJECTS USING A TAXONOMY

BACKGROUND OF THE INVENTION

1. Field of Invention

The present invention relates generally to measures of similarity. More specifically, the present invention is related to computer-based method to find similar objects using a taxonomy.

2. Discussion of Prior Art

Taxonomies have long been recognized as a useful tool for classification. In addition to providing a precise way to name classes of individuals that share certain properties or behavior, they also provide a means of determining how similar one such individual is to another. In its simplest form, a taxonomy defines a hierarchical grouping of individuals into ever more specific classes. Two individuals share the properties of the most specific grouping that includes both of them, and the degree to which the two individuals are similar depends on the location of this class in the hierarchy. The lower in the hierarchy, the more similar the individuals are. Thus, for example, two rats of the same species are more similar than rats of different species, and a rat of any species is more similar to another rodent than it is to a camel. Various authors (see papers to: (1) Resnik titled "Using information content to evaluate semantic similarity in a taxonomy", (2) Wu et al. titled "Verb semantics and lexical selection", and (3) Lin titled "An information-theoretic definition of similarity") have defined ways of turning this intuitive idea of similarity into a numeric value that can be used to rank the similarity of objects.

The ability to find similar objects given a description of a target is useful in many domains. For example, one may wish to find patents similar to a given patent, or subjects similar to a hypothetical "ideal" subject for a clinical trial. In bioinformatics, one may wish to find gene products (e.g. proteins) similar to a given gene product. In each of these domains, and others, comprehensive taxonomies have been defined and used by various organizations to classify sets of objects.

Classification using such taxonomies is more complex than the simple example described above. Firstly, it is frequently the case that a class of individuals may specialize the properties of more than one parent class. Furthermore, taxonomies often evolve, as new specialized groupings are formed and older ones are reorganized. Even with an unchanging taxonomy, the classification of a particular object may evolve as more is learned about it or users of the taxonomy may disagree as to how it should be classified. Lastly, real taxonomies tend to be quite large, and the sets of objects they are used to classify are often very large. Thus, any approach to finding similar, objects must scale well in both these dimensions.

Whatever the precise merits, features, and advantages of the above cited similarity measures, none of them achieves or fulfills the purposes of the present invention.

SUMMARY OF THE INVENTION

In one embodiment, the present invention provides for a computer-based method of finding similar items labeled in a taxonomy comprising the steps of: (a) determining a label $L_A$ representing a set of concepts that a target object T and a candidate object C have in common, wherein the target object T and candidate object C are part of a taxonomy structure as acyclic graphs with at least one child class has multiple parents; (b) determining information content $I(L_A)$ of label $L_A$ representing the set of common concepts; (c) combining individual information content $I(L_T)$ and $I(L_C)$, where $I(L_T)$ and $I(L_C)$ represent individual information content of labels of target object and candidate object, respectively, (d) finding similarity between the target object and said candidate object in said taxonomy as a function of $I(L_A)$ and $I(L_T)+I(L_C)$, and wherein the information content $I(L_A)$, $I(L_T)$, and $I(L_C)$ are functions of inclusion probabilities $p(L_A)$, $p(L_T)$, and $p(L_C)$, respectively, with the inclusion probability of label L defined as the probability that an ancestor graph of label L of an object o chosen at random from a corpus $\vartheta$ contains L, and the similarity between the target object T and the candidate object C is found based on the following mathematical function:

$$sim(T, C) = \frac{2I(L_A)}{I(L_T) + I(L_C)}.$$

with the inclusion probability being given by: $p_i(L)=p(L \subseteq \text{Terms}(\text{Anc}(o)))$. Also provided is an article of manufacture having computer readable program code implementing the above mentioned steps.

In another embodiment, the present invention provides for a computer-based method of finding similar items labeled in a taxonomy comprising the steps of: (a) determining a label $L_A$ representing a set of concepts that a target object T and a candidate object C have in common, said target object T and candidate object C part of a taxonomy structure as acyclic graphs wherein at least one child class has multiple parents; (b) determining information content $I(L_A)$ of label $L_A$ representing the set of common concepts; (c) combining individual information content $I(L_T)$ and $I(L_A)$, where $I(L_T)$ represent information content of label of target object; (d) finding similarity between the target object and the candidate object in the taxonomy as a function of $I(L_A)$ and $I(L_T)+I(L_A)$, wherein the similarity is equal to 1 if and only if object C is substitutable for object T and and the information content $I(L_A)$, $I(L_T)$, and $I(L_C)$ are functions of inclusion probabilities $p(L_A)$, $p(L_T)$, and $p(L_C)$, respectively, with the inclusion probability of label L is defined as the probability that an ancestor graph of label L of an object o chosen at random from a corpus $\vartheta$ contains L, and the similarity between the target object T and the candidate object C is found based on the following mathematical function:

$$sim_G(T, C) = \frac{2I(L_A)}{I(L_T) + I(L_A)}.$$

with the inclusion probability being given by: $p_i(L)=p(L \subseteq \text{Terms}(\text{Anc}(o)))$. Also provided is an article of manufacture having computer readable program code implementing the above mentioned steps.

In another embodiment, the methods of the present invention are implemented in conjunction with an object relational-database.

In another embodiment, the methods of the present invention are iteratively performed for more than one candidate object, with said more than candidate objects being ranked in order of similarity.

In another embodiment, the methods of the present invention further utilize pre-computed ancestor graphs for candidate objects labels and each individual term in a taxonomy.

A pragmatic approach is provided to the use of taxonomies to find similar objects. Informally, given a set of objects and given a selection of a specific object from the set (the target object), the remaining objects in the set (the candidate objects) need to be ordered by how similar they are to the one selected. An assumption is made that the objects have been labeled with one or more terms from a taxonomy, and a similarity measure for objects labeled in this way is defined. The measure is based on Lin's information-theoretic similarity measure for terms in a hierarchical taxonomy (see paper to Lin et al. titled "An information-theoretic definition of similarity"). Lin's measure is generalized to taxonomies described by directed acyclic graphs of terms, and a definition is provided for a new similarity measure that can be used when objects are labeled with sets of terms, rather than a single term. Also shown is how to adapt the measure in the presence of ambiguity introduced by an evolving taxonomy or classifiers with imperfect knowledge. Also described is a scalable implementation of the measure that is tightly integrated with an object-relational database, and the present invention's approach is evaluated by applying it to an object-matching problem from bioinformatics for which the correct answers are known a priori.

DESCRIPTION OF THE PREFERRED EMBODIMENTS

Figure 1B:
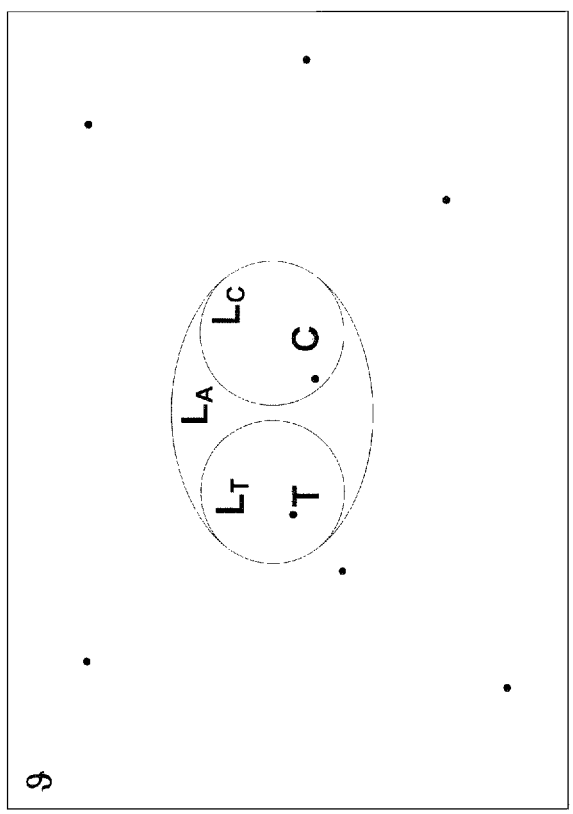
FIG. 1 illustrates two objects being compared, T and C, according to one embodiment of the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

The idea of using an information-theoretic definition of similarity to compare objects labeled using a taxonomy was introduced by Resnik in the paper titled "Using information content to evaluate semantic similarity in a taxonomy". Given a taxonomy defined over a set of terms T, Resnik defined the similarity of two terms $t_1 \in T$ and $t_2 \in T$ with respect to a corpus of objects $\vartheta$ as $$\max_{\hat{t} \in S(t_1, t_2)} [-\log p(\hat{t})]$$

where $S(t_1, t_2)$ is the set of terms in T that subsume $t_1$ and $t_2$ and $p(t)$ is the probability that an object randomly chosen from C represents an occurrence of term t. An object represents an occurrence of a term t if it is labeled with t or a descendant of t.

The quantity $I(t) = -\log p(t)$ is known as the information content of term t. Resnik's definition of similarity captures the idea that the similarity between two objects depends not only on what they have in common, but also on the context in which they are compared. It has many intuitively appealing properties. If the taxonomy is a hierarchy (i.e. a tree), the term $\hat{t}$ satisfying Resnik's definition will be the least common ancestor of $t_1$ and $t_2$. As the commonality of the terms decreases, the position of $\hat{t}$ moves higher in the hierarchy, becoming the root r if the terms have nothing in common. Since every object in $\vartheta$ represents an occurrence of the root, $p(r)=1$ and $I(r)=0$. Conversely, if $t_1=t_2$, $I(\hat{t})=I(t_1)=I(t_2)$.

Lin in the paper titled "An information-theoretic definition of similarity" derives an axiomatic definition for similarity based on a limited set of assumptions that can be summarized as follows:

1. The maximum similarity between two (identical) objects is 1 and the minimum similarity is 0.
2. The similarity between two objects is a function of their commonality and their differences.
3. If each object can be described from several perspectives, the overall similarity of two objects is a weighted average of their similarities as seen from the individual perspectives.'

Under these assumptions, and additionally assuming that the target and candidate objects are selected independently, the similarity between a target object T and a candidate object C is:

$$sim(T, C) = \frac{I(\text{common}(T, C))}{I(descr(T)) + I(descr(C))} \quad (1)$$

where common(T,C) represents a description of what the two objects have in common, and descr(T) and descr(C) represent descriptions of the two objects individually.

If T and C are each labeled by a single term from a hierarchical taxonomy, their commonality is represented by the term that is the least common ancestor a of the terms t and c that were used to describe T and C, respectively. With respect to a particular corpus of objects C, the similarity becomes:

$$sim(T, C) = \frac{2I(a)}{I(t) + I(c)} = \frac{-2\log p(a)}{-\log p(t) - \log p(c)} \quad (2)$$

Suppose, for example, that $\vartheta$ is a set of edible thing and that t, the label of T, is "apple" and c, the label of C, is "pear". If a, the least common ancestor of t and c, is the term "fruit", then the numerator of the similarity measure represents the probability that two objects randomly chosen from $\vartheta$ are both labeled with terms that denote kinds of fruit, and the denominator represents the probability that one is labeled an apple and one is labeled a pear.

Equation (2) intuitively captures the idea of similarity in the most straightforward case, in which the taxonomy is structured as a tree and each object is labeled by a single term. As noted in previously, however, in practice many taxonomies are not trees, but allow a new term to be derived from multiple parents. Furthermore, classification systems often allow an object to be labeled using multiple terms. The definition of similarity under these more general conditions is now addressed. First, a taxonomy is defined as a directed acyclic graph.

Definition 1 (Taxonomy). A taxonomy T is a directed acyclic graph (N, E, r), where N is a set of nodes, E is a set of directed edges and $r \in N$ is a unique root node of T from which every other node is reachable.

Each node n∈N represents a term of T, and the words "node" and "term" are used interchangeably. Each directed edge e∈E connects a more general parent term to a more specific child term. For convenience, the in-neighbor region of a node (i.e. all nodes from which the given node is reachable) is referred to as its ancestor graph. Further, the use of the term "ancestors" refers to nodes in the in-neighbor region. The term "descendants" is also used in an analogous manner. In addition, portions of the taxonomy are described as subgraphs of T. The notation Terms(g) is used to refer to the set of nodes in a subgraph g.

A label is a subset of the terms in the taxonomy. A label can be used to represent the classification of a specific object, but it can also be used to represent more general concepts, like what two objects have in common.

Definition 2 (Label). Given a taxonomy T=(N, E, r), a label is a nonempty set of terms L⊆N.

If a term in a taxonomy applies to an object, so do the terms that correspond to each of its ancestors. Therefore, some of the terms in a label may be redundant. The concept of a minimal label is defined to eliminate such terms.

Definition 3 (Minimal Label). A label L is a minimal label if for every term l∈L, no ancestor of l is also in L.

Given a label L, one can derive a unique minimal label L' by removing from L every term that is an ancestor of another term in L. Let Lmin(L) denote the minimal label derived from L.

A labeling assigns a label to each object in some corpus.

Definition 4 (Labeling). Given a taxonomy T and a corpus ϑ, a labeling is a total function L: ϑ→$2^N$. If o is an object in ϑ, let L(o) denote the label for object o.

A label can also be associated with any subgraph of the taxonomy. The label for a subgraph is the set of nodes contained in the subgraph, i.e. Terms(g). For convenience, however, labels are generally referred with the notation $L_X$, where X may be either an object or a graph.

A labeling is a proper labeling if for all o∈ϑ, L(o)≠∅, and a minimal labeling if for all o∈ϑ, L(o) is a minimal label. It is assumed that all labelings are minimal proper labelings unless otherwise noted.

It is also useful to be able to enumerate all the terms associated with a label, either directly or indirectly. The concept of an ancestor graph is formalized.

Definition 5 (Ancestor Graph). Let L be a label. For each term l∈L, let in(l) be the in-neighbor region of l in T. The ancestor graph of L is the union of the in-neighbor regions of the terms contained in L. That is:

$$Anc(L) = \cup_{l \in L} in(l)$$

Given an object o with label $L_o$, the notation Anc(o) is used to refer to the ancestor graph of $L_o$. The set of nodes Terms (Anc(o)) represent an exhaustive list of the terms associated with o.

A probability is associated with an arbitrary label. Its value is the probability of finding an object to which at least those terms in the label L apply. This is referred to as the inclusion probability, $p_i(L)$.

Definition 6 (Inclusion Probability). Let L be a label. Then $p_i(L)$ is the probability that the ancestor graph of the label of an object chosen at random from ϑ contains L. That is, given a randomly chosen object o:

$$p_i(L) = p(L \subseteq Terms(Anc(o)))$$

If the ancestor graph of an object's label contains L, it also contains Lmin(L) and vice versa. Hence, if L is not minimal, the extra terms do not affect its inclusion probability. That is, $p_i(L) = p_i(Lmin(L))$.

Inclusion probability gives a tool needed to apply Lin's general definition of similarity from Equation (1) to a taxonomy. To quantify the individual information content of the objects being compared (the denominator of Equation 1), the inclusion probability of their labels is used. To quantify the information content of the commonality between the two objects (the numerator of Equation 1), a label $L_A$ is found to represent that commonality, and use the corresponding inclusion probability. The label $L_A$ is constructed by intersecting the ancestor graphs of the labels of the objects being compared. The resulting measure is referred to as holistic similarity because it treats all the terms in a label as a group. As will be see later, other measures that have been suggested for use when objects are labeled with multiple terms treat each term individually.

Definition 7 (Holistic Similarity). Let $L_T$ and $L_C$ be the labels of objects T and C, respectively, and let $L_A$=Lmin (Terms(Anc($L_T$)∩Anc(LC))). Then:

$$sim(T, C) = \frac{-2\log p_i(L_A)}{-\log p_i(L_T) - \log p_i(L_C)}$$

Alternatively, expressed in terms of the information content corresponding to each probability:

$$sim(T, C) = \frac{2I(L_A)}{I(L_T) + I(L_C)}$$

The use of inclusion probability in Definition 7 reflects an important assumption about the assignment of labels to objects, namely that labeling an object with one or more terms implies only that at least those terms (and their ancestors) apply to the object. This open-world interpretation of labels contrasts with the closed-world model of traditional databases, under which all terms not included in a label's ancestor graph do not apply to the labeled object.

An open-world model is adopted for a number of reasons. In the first place, it more accurately reflects how taxonomies are used in many domains. Frequently, both the label of an object and the structure of the taxonomy itself change as knowledge accumulates concerning the domain and the objects of interest. At any point in time, the label of an object only reflects what has been discovered about it so far. Secondly, when the taxonomy is structured as a DAG, the closed-world assumption is incompatible with the use of interior terms in labels.

Figure 1A:
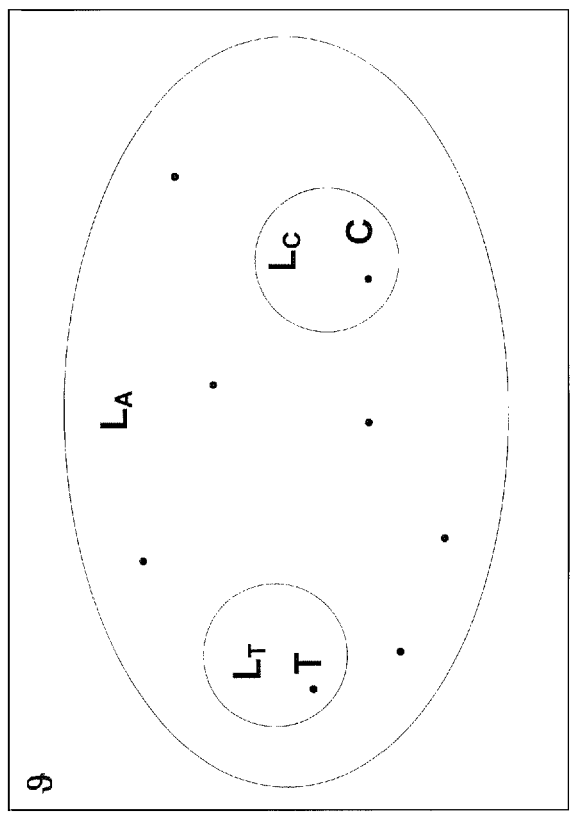

FIG. 1 illustrates, graphically, the idea behind the present invention's measure, by depicting two objects being compared, T and C, as members of populations to which their particular label applies. All such objects are also members of the larger set of objects for which label $L_A$ applies, and are of course also members of ϑ, the corpus. The sizes of these sets relative to each other and the size of the corpus determine the similarity of the objects being compared. The larger the region associated with $L_A$ relative to the size of ϑ, the less significant it is that the objects being compared are included in this set, because the same also applies to many other objects in ϑ. Similarly, the smaller the size of regions $L_T$ and $L_C$ relative to $L_A$, the less significant it is that both objects are in $L_A$, because many objects share this trait. Thus, as illustrated in FIG. 1(a), maximum similarity (short of identity) occurs when $L_A$ is a small fraction of ϑ and only objects labeled with $L_T$ or $L_C$ are contained within it. Conversely, similarity is at a minimum when $L_A$ contains most of $\vartheta$, including many objects other than those labeled with $L_T$ or $L_C$, as in FIG. 1(b).

When the taxonomy is a tree and each object is labeled with a single term, Definition 7 reduces to Equation 2. Consider objects T and C, labeled with terms t and c, respectively. When T is a tree, $L_A$, the minimal label for the intersection of the ancestor graphs of t and c, is a, the least common ancestor of t and c in T.

As defined by Equation 2, Lin's formulation cannot be used when the taxonomy is a DAG, because the terms describing the objects do not necessarily have a unique least common ancestor. Nor is it applicable when objects are labeled with multiple terms. Resnik's similarity measure, which is defined in terms of the ancestor with the maximal information content, could be used with a DAG taxonomy, but not when multiple terms are used as labels. However, because it is specified over labels, not terms, holistic similarity is well-defined in both of these cases.

Generic Similarity

Now, the use of the interior terms of a taxonomy in labels are considered. First, the meaning of using such a term in a label is addressed.

When an interior term is used in a label, there are two possible interpretations. The term may have been selected because no more specific term in the taxonomy applies to the object in question. For example, consider the taxonomy of FIG. 2(a). If the object to be labeled is a mango, the interior term "fruit" is the most appropriate label, because none of the more-specific terms apply. On the other hand, the individual doing the labeling may choose an interior term because he or she does not know which (if any) more specific term applies. The first type of labeling is referred to as careful and the second type is referred to as generic. Both often occur in practice, in particular as a taxonomy evolves. Initially, a single term may be applied to what later turns out to be a whole group of distinct subclasses of objects. Over time, as these subclasses are recognized, new more-specific terms are created. However, objects classified under one version of the taxonomy are not necessarily reclassified whenever the taxonomy evolves.

To accommodate the careful use of interior terms as labels, the taxonomy is augmented by adding a new descendant term, X*, for every interior term X used as a label. X* is referred to as an anonymous term, because it describes an unnamed subset of the objects to which the term X applies.

Figure 2B:
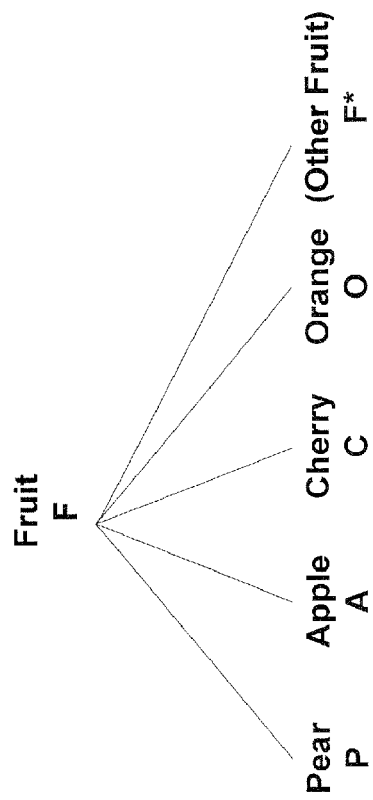
FIG. 2 illustrates the use of anonymous terms according to another embodiment of the present invention.
Figure 2A:
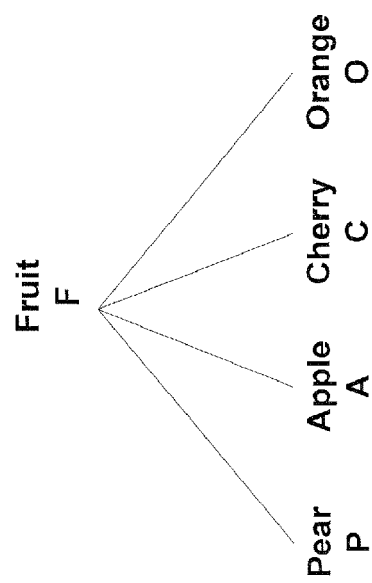

In the taxonomy of FIG. 2(b), an anonymous term F* has been added to the taxonomy of FIG. 2(a). An object carefully labeled "fruit" will be considered an instance of F* and all of its ancestors (including F). If an object can be labeled with multiple terms, it may also be necessary to introduce an anonymous term for combinations of terms that are used carefully. As far as the definition of similarity is concerned, anonymous terms behave exactly like real terms in T.

Unlike careful labeling with interior terms, generic labeling forces one to rethink the basic understanding of similarity by introducing uncertainty into the labeling of objects. If a target object is labeled "fruit", and there is an uncertainty as to which specific kind of fruit it is, candidate objects labeled "apple", "pear", or 'fruit" all fulfill the only specific requirement posed by the labeling of the target object, that of being a fruit. However, if Definition 7 was applied, only the candidate labeled "fruit" will receive a similarity score of 1 with respect to the target. In effect, sim penalizes objects labeled "apple" or "pear" for being "too specific" when the target object is generic. Note that the situation changes when the roles of target and candidate are reversed. If the target object is labeled "apple", a candidate object labeled "apple" is a better match than one labeled "pear" or "fruit".

To reflect the asymmetry introduced by generic labeling, a revised similarity measure, $sim_G$, is defined such that $sim_G(T, C)=1$ if and only if object C is substitutable for object T. This idea is familiar from the use of type hierarchies in programming languages, where an instance of a subtype is substitutable for an instance of a supertype, but not the other way around.

Definition 8 (Generic Holistic Similarity). Let $L_T$ and $L_C$ be the labels of objects T and C, respectively, and let $L_A$=Lmin (Terms(Anc($L_T$)∩Anc($L_C$))). Then:

$$sim_G(T, C) = \frac{-2\log p_i(L_A)}{-\log p_i(L_T) - \log p_i(L_A)}$$

Alternatively, expressed in terms of the information content corresponding to each probability:

$$sim_G(T, C) = \frac{2I(L_A)}{I(L_T) + I(L_A)}$$

Figure 3B:
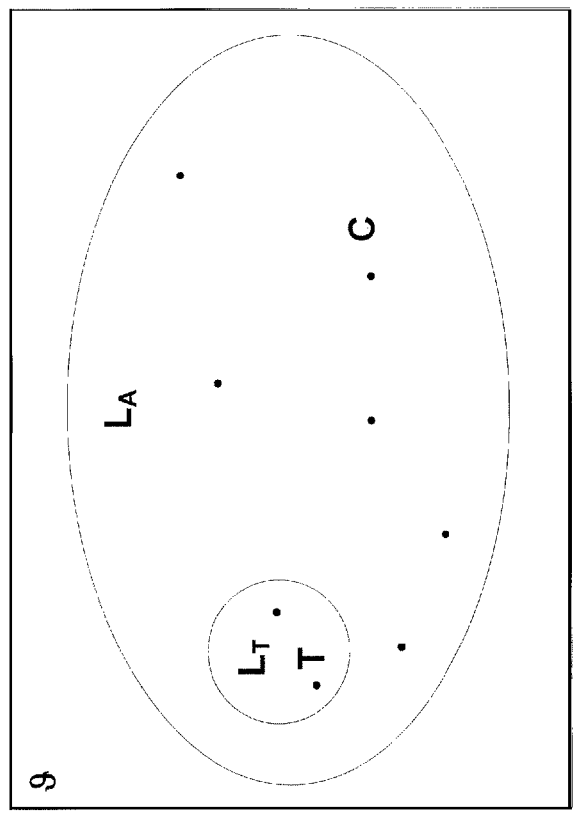
FIG. 3 illustrates two objects being compared, T and C, according to a second embodiment of the present invention.
Figure 3A:
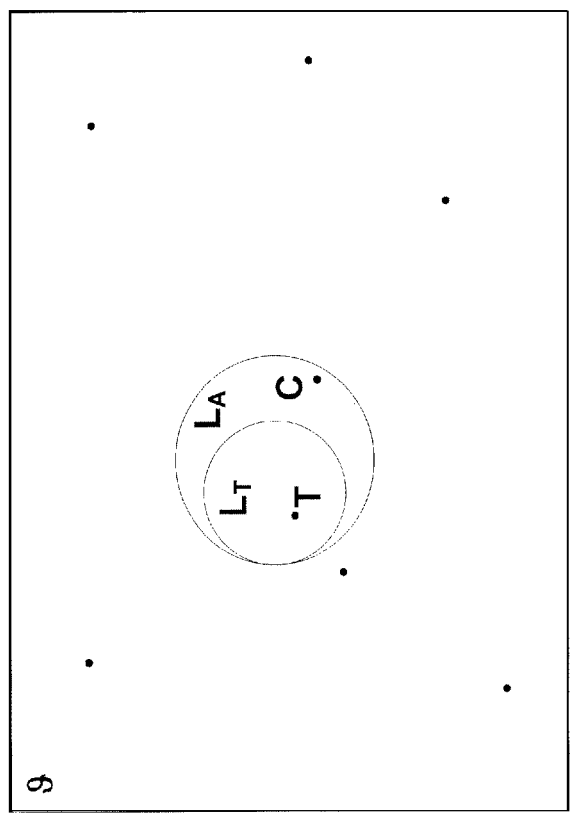

The generic similarity measure views the candidate object, C, as an instance of the most specific class of objects that includes both the target and the candidate. FIG. 3 depicts a target object T compared to a candidate object C using $sim_G$. As in the case of sim, the larger the region associated with $L_A$ relative to the size of $\vartheta$, the less significant it is that the objects being compared are included in this set. Similarly, the smaller the size of region $L_T$ relative to region $L_A$, the less significant it is that both objects are in $L_A$. As illustrated in FIG. 3(a), maximum similarity (short of identity) occurs when $L_A$ is a small fraction of $\vartheta$ and most of the objects within it are labeled with $L_T$. Conversely, similarity is at a minimum when $L_A$ contains most of $\vartheta$, including many objects other than those labeled with $L_T$, as in FIG. 3(b).

Figure 4:
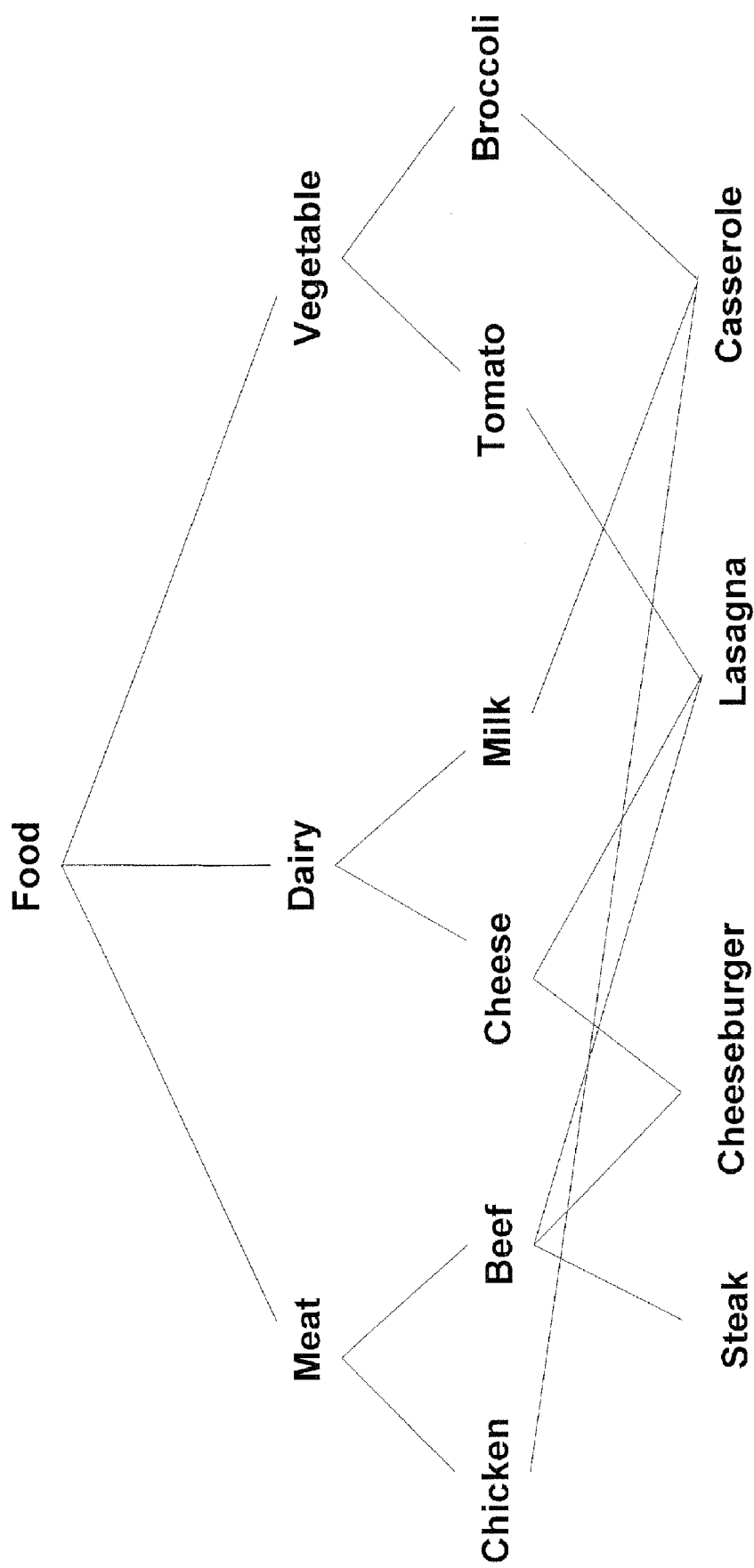
FIG. 4 illustrates a taxonomy labeled with generic terms.

The use of generic labeling also reinforces the choice of an open-world model, because when the taxonomy is structured as a DAG, the closed-world model is incompatible with the use of generic terms as labels. To see why, consider the taxonomy of FIG. 4. If an object is labeled with the generic term {Beef}, it is interpret to mean that the labeler is uncertain as to which of the terms describing a more specific type of beef applies. The object could be a steak, which is "just" beef, or it could be a cheeseburger. Because a cheeseburger contains additional ingredients (i.e. cheese), the ancestor graph of the label {Cheeseburger} contains terms not found in the ancestor graph of {Beef}, violating the closed-world assumption.

A set of examples demonstrate how $sim_G$ orders candidate objects with respect to a fixed target. The examples are based on the taxonomy of FIG. 4, and are intended to be illustrative rather than to provide an exhaustive case analysis.

Table 1 below shows the similarity of five candidate objects to a common target object T labeled {Beef, Cheese}. The first candidate, labeled {Cheeseburger}, is a specialization of the target object and therefore substitutable for it. It receives a similarity score of 1 because its ancestor graph includes the complete ancestor graph of the target. The same is true of $c_2$, the candidate labeled {Beef, Cheese, Tomato}.

TABLE 1

| C | $L_C$ | $L_A$ | simG(T,C) |
|---|---|---|---|
| c1 | {Cheeseburger} | {Beef, Cheese} | $\dfrac{2I(\text{Beef, Cheese})}{I(\text{Beef, Cheese}) + I(\text{Beef, Cheese})} = 1$ |
| c2 | {Beef, Cheese, Tomato} | {Beef, Cheese} | $\dfrac{2I(\text{Beef, Cheese})}{I(\text{Beef, Cheese}) + I(\text{Beef, Cheese})} = 1$ |
| c3 | {Steak} | {Beef} | $\dfrac{2I(\text{Beef})}{I(\text{Beef, Cheese}) + I(\text{Beef})}$ |
| c4 | {Steak, Milk} | {Beef, Diary} | $\dfrac{2I(\text{Beef, Dairy})}{I(\text{Beef, Cheese}) + I(\text{Beef, Dairy})}$ |
| c5 | {Casserole} | {Meat, Diary} | $\dfrac{2I(\text{Meat, Dairy})}{I(\text{Beef, Cheese}) + I(\text{Meat, Dairy})} = 1$ |

The ancestor graph of $c_3$, labeled {Steak}, includes the term "Beef" and all its ancestors, but only intersects with the ancestors of "Cheese" at the root of the taxonomy ("Food"). $L_A$ is therefore {Beef}, the minimal label of the intersection of the target and candidate ancestor graphs. Since I(Beef) is calculated using inclusion probability, it reflects not only the number of objects labeled {Beef}, but also the populations of objects whose labels are descendants of {Beef} (e.g. {Steak}, {Lasagna}) and those that include the term "Beef" among others in their label (e.g. {Beef, Broccoli}). $c_4$, the candidate labeled {Steak,Milk}, is similar to $c_3$, but in this case $L_A$={Beef, Dairy}. The size of the population associated with this label is smaller than the one associated with {Beef}, since it includes only those objects whose label includes the term "Dairy" (or one of its descendants) as well as the term "Beef" (or one of its descendants). Hence, the information content of this label is higher, and $c_4$ will receive a higher similarity score than $c_3$. For $c_5$, labeled {Casserole}, $L_A$={Meat, Dairy}. Because inclusion probability associates more objects with this label than with the label {Beef, Dairy}, $c_5$ will receive a lower similarity score than $c_4$.

The literature describes three distinct groups of similarity measures that can be applied to taxonomies. The first group of measures, referred to as term-similarity measures, can be used to compute the similarity of two individual terms. The other two groups of measures can be used when an object is labeled with multiple terms.

In the context of machine translation, Wit and Palmer (see paper titled "Verb semantics and lexical selection") defined a term similarity measure based on the depth in the taxonomy of the least common ancestor of two terms relative to the depths of the terms individually. The "closer" the common ancestor is to the terms themselves, the greater the similarity. Wu and Palmer did not describe how to use their approach when the taxonomy is a DAG. Another problem with this approach is that some portions of the taxonomy may have been extensively developed and contain many terms, whereas other areas are sparse. Such variations in the "density" of terms make this and other measures that rely on edge counts a poor estimate of similarity.

As noted previously, the idea of using information content to measure similarity is due to Resnik. Using the WordNet taxonomy anti frequency estimates derived from a large body of English text, Resnik calculated the semantic similarity of word pairs by selecting the common ancestor with the greatest information content. For words with multiple senses, Resnik used the sense that produced the maximum similarity. Using judgments made by human subjects as the standard, Resnik found that his measure worked better than earlier ones based on edge-counting. Although Resnik's measure can be used when the taxonomy is structured as a DAG, it cannot be used directly when objects are labeled with multiple terms, and it has a number of other disadvantages. Its range is not normalized to [0, 1], but more importantly, by selecting the ancestor with the greatest information content it understates the similarity of objects by focusing on the single most significant aspect of their commonality, at the expense of all others.

Lin provided an axiomatic definition of similarity, and showed how Resnik's approach could be adapted to fit this framework. Whereas Resnik's measure was based solely on the commonality between word meanings, Lin's approach also takes into account the differences in meaning to determine a normalized similarity score (see Equation 2). Lin compared his measure to Resnik's and to Wit and Palmer's, and found that it produced scores that were better correlated with human judgments than those produced by the other two measures. However, Lin does not describe how to use his measure when the taxonomy is a DAG, or when multiple terms are used to describe an object.

The similarity measures in the second group described in the literature measure the similarity of objects based on the number or frequency of terms that are common to the descriptions of both objects. Measures in this group include Jaccard, Dice and Set Cosine, which are used frequently in information retrieval systems and differ in how the count of common terms is normalized, as well as the FMS measure of Keller et al (see paper titled "Taxonomy-based soft similarity measures in bioinformatics"). These measures do not take the structure of the taxonomy into account. Any candidate object that does not share terms with the target will receive a score of zero, even though it may be quite similar.

The third set of proposed similarity measures relies on an underlying term-similarity measure to determine the similarity between individual pairs of terms, and then combines these to yield an overall similarity score. Halkidi et al. in their paper titled "Organizing web document collections based semantics and clustering" defined a similarity measure of this type for use in clustering web documents. Using the Wu and Palmer term similarity measure, Halkidi et al. consider each term in the target and candidate sets individually, and find the most similar term from the other set. Then, over each term set (the target set and the candidate set), Halkidi et al. average the similarity of these best matches. Finally, Halkidi et al. combine the average similarity from the two sets with equal weight. Since Halkidi et al. use Wu and Palmer as the underlying term similarity measure, it is not clear how to apply this measure when the taxonomy is a DAG.

Wang et al. in their paper titled "Gene expression correlation and gene ontology-based similarity: An assessment of quantitative relationships" developed a similarity measure that avoids this problem by using a generalized form of Lin's information-theoretic similarity measure to determine the similarity of each term-pair. If t and c are the target and candidate terms:

$$sim_{Lin*}(t, c) = \frac{2 * \max_{t_a \in Terms(Anc(c) \cap Anc(t))} I(t_a)}{I(t) + I(c)}$$

Note that Wang et al. generalize Lin's formula from Equation 2 for use in a DAG taxonomy by selecting the least common ancestor with the maximum information content. This is not the same as applying the present invention's formulation in Definition 7 to a pair of single terms, and does not follow directly from Lin's axiomatic definition of similarity in Equation 1 because it considers only a portion of the commonality between the terms. Wang et al. also use a different function than Halkidi et al. for combining term-pair scores. Instead of averaging the scores of the best match from the other set for each term, they average the terms similarity scores across all term pairs.

All measures in this third group draw an arbitrary distinction between combinations of terms for which a new term has been coined and those for which one has not. Furthermore, although the term similarities can be combined in various ways, none of these follows directly from Lin's definition of similarity.

Keller et al. present several ways of quantifying similarity using fuzzy measures based on the depth or information content of terms. However, their measures either require subjectively-specified weights, or the solution of a high-order polynomial equation for each pair of target and candidate objects. This is prohibitively expensive for large problems.

The present invention's holistic measures sim and $sim_G$ do not belong to any of these groups. Unlike the term similarity measures, they can be used when labels contain multiple terms. Unlike the common term measures, they take distinct but similar terms into account. Unlike the pairwise measures, they do not consider individual terms, but rather take all the terms in each label into account simultaneously.

Later, a description is provided as to how the similarity measures are evaluated using the taxonomy and associations defined by the Gene Ontology (see paper to Ashburner titled "Gene ontology: Tool for the unification of biology"). Like the present approach, other authors have used taxonomic similarity measures in concert with the Gene Ontology to address the problem of finding gene products similar to a specified target. Lord et al. in their paper titled "Investigating semantic similarity measures across the gene ontology: The relationship between sequence and annotation" evaluate the Resnik and Lin measures, and a distance measure due to Jiang and Conrath (see paper titled "Semantic similarity based on corpus statistics and lexical taxonomy"), by determining how well their similarity scores correlate with similarities discovered by comparing the genetic sequences of the target and candidate objects. Similarly. Wang et al. evaluate their measure by determining how well it correlates with functional properties derived from gene expression data.

In implementing the similarity measures described previously, a goal was to accommodate both large taxonomies and large corpora of objects. The implementation is therefore built in the context of an object-relational database management system, specifically IBM DB2 Universal Database V8.2. This approach offers a number of advantages. In the first place, storing the corpus in a database allows the full power of SQL to be used to select those objects of interest in a particular situation. For example, a user searching for similar objects in a large database of gene products may wish to restrict the search to human gene products. Secondly, the ability to extend the database management system with user-defined types and functions allows the implementation of certain critical operations very efficiently within the database, without requiring large amounts of data to be retrieved for manipulation by an application.

In one implementation, each similarity measure is implemented as an SQL query against a set of relations with a fixed schema. One purpose of these relations is to present in a standard format, the taxonomy itself and the associations between terms from the taxonomy and objects in the corpus. The taxonomy is represented as a table of (parent term id, child term id) pairs; the associations are represented as (term id. object id) pairs. Since the associations for the target and candidate objects may ill general come from different sources, separate relations are used to represent them. These relations may be base tables, but are more likely views created over the native representation of the associations.

Once the taxonomy and the associations have been specified, additional tables are defined to store information that can be pre-computed once and used repeatedly in subsequent evaluations of the similarity measure.

Within each query, certain critical operations are implemented as User Defined Functions (UDF's) that operate on User Defined Types (UDTs) represented in the database as Binary Large Objects (BLOBs). Two types of operations warranted such special treatment.

Firstly, the taxonomy is naturally represented as a directed graph, and a key step in the evaluation of sim, simG, and various other measures involves the determination of common ancestors between the labels of target and candidate objects. Therefore, a general-purpose graph library for DB2 is extensively used. The library allows graphs to be constructed efficiently from database data using a user-defined aggregate function. Once constructed, they can be stored in the database as BLOBs and manipulated by UDFs that implement a wide range of graph-theoretic operations, e.g. finding the in-neighbor region of a node, graph intersection, etc. Table functions are provided that return the edges or nodes in a graph, along with payload values and various properties, e.g. the incoming edge count for a node. A full discussion of the graph library, which scales to very large graphs, is beyond the scope of this paper.

A second critical step in the evaluation of sim and $sim_G$ is the determination of the inclusion probabilities of particular labels. To determine the inclusion probability of a label L, one must know its frequency, that is, the number of objects in the corpus to which all of the terms in L apply. Recall that a term t applies to an object o if and only if the ancestor graph of the object's label includes the term in question, i.e. if t∈Terms(Anc(o)).

In principle, one could pre-compute frequencies for each of the $2^{|N|}$ combinations of terms that can be used as a label. For taxonomies of realistic size, however, this approach is impractical. Instead, an inverted list for each term is built, identifying the objects to which the term applies, i.e. those objects whose labels contain the term or any of its descendants. Let O(t) denote the list of objects for term t. The frequency of a label can then be determined by finding the size of the intersection of the inverted lists of its individual terms. The inclusion probability is therefore:

$$p_i(L) = \frac{|\bigcap_{t \in L} O(t)|}{\vartheta}$$

Like the taxonomy graph, the inverted lists are implemented as a User Defined Type optimized to support the operations needed to compute label frequency: intersection and length. The inverted list UDT stores a list of object identifiers as a simple vector. Identifiers can be inserted in any order as the list is built (using a user-defined aggregate function), and the list is sorted once when insertion is complete. The intersection of two lists can be computed with a single pass through both lists, and a user-defined aggregate function is provided to find the intersection of a set of lists.

In principle, all the information needed to compute sim or $sim_G$ can be derived dynamically from the relations that define the taxonomy and the association corpus. However, certain information used to find and rank candidate objects can be used repeatedly for different target objects, as long as neither the taxonomy nor the corpus changes. Next, several situations are considered in which such values are pre-computed.

Whenever a target and candidate object is compared, the intersection of their respective ancestor graphs needs to be found. Furthermore, the same candidates are evaluated for many different targets. Therefore, the ancestor graph for the label of each object in the corpus of candidate objects is pre-computed. The graph library can generate ancestor graphs quite quickly, so pre-computation is practical even for corpora of large size. The space requirement is modest, because the ancestor graph for an object is typically a small fraction of the entire taxonomy. Details for the experimental scenario are described later. Updates to the candidate corpus can be handled incrementally, but updates to the taxonomy may require a complete re-computation of these graphs.

It should be noted that only the ancestor graphs for candidate object labels are pre-computed, not target object labels, since each target object is generally only referenced once. However, the ancestor graph for each individual term in the taxonomy is pre-computed. These graphs make the dynamic computation of ancestor graphs for target object labels more efficient, and are reused many times since many targets refer to the same terms. They consume much less space than the candidate label ancestor graphs because there are far fewer terms than labels, and each graph is smaller. The term ancestor graphs are not affected by updates to the corpus, but may need re-computation when the taxonomy changes.

The final set of pre-computed objects is the inverted lists. For each term in the taxonomy, a list is built containing the identifiers of all objects in the corpus that contain the term, or a descendant of the term, in their label. As noted above, this allows us to find the inclusion probability of an arbitrary label by intersecting the lists corresponding to its terms. The size of these lists is proportional to the size of the corpus. The lists can be updated incrementally as objects are added to the corpus, but may need to be recomputed if objects are deleted or the taxonomy changes.

Additionally, the present invention provides for an article of manufacture comprising computer readable program code contained within implementing one or more modules to find similar items labeled in a taxonomy. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) determining a label $L_A$ representing a set of concepts that a target object T and a candidate object C have in common, the target object T and candidate object C part of a taxonomy structures as acyclic graphs wherein at least one child class has multiple parents; (b) determining information content $I(L_A)$ of label $L_A$ representing the set of common concepts; (c) combining individual information content $I(L_T)$ and $I(L_C)$, where $I(L_T)$ and $I(L_C)$ represent individual information content of labels of target object and candidate object, respectively, and (d) finding similarity between the target object and the candidate object in said taxonomy, wherein the similarity between the target object T and the candidate object C is found based on the following mathematical function:

$$sim(T, C) = \frac{2I(L_A)}{I(L_T) + I(L_C)}.$$

Also, implemented in computer program code based products are software modules for: (a) determining a label $L_A$ representing a set of concepts that a target object T and a candidate object C have in common, the target object T and candidate object C part of a taxonomy structure as acyclic graphs wherein at least one child class has multiple parents; (b) determining information content $I(L_A)$ of label $L_A$ representing the set of common concepts; (c) combining individual information content $I(L_T)$ and $I(L_A)$, where $I(L_T)$ represent information content of label of target object; (d) finding similarity between the target object and the candidate object in the taxonomy based on the following mathematical function:

$$sim_G(T, C) = \frac{2I(L_A)}{I(L_T) + I(L_A)}, \text{ and}$$

wherein the similarity is equal to 1 if and only if object C is substitutable for object T.

CONCLUSION

A system and method has been shown in the above embodiments for the effective implementation of computer-based methods and system for finding similar objects using a taxonomy. While various preferred embodiments have been shown and described, it will be understood that there is no intent to limit the invention by such disclosure, but rather, it is intended to cover all modifications falling within the spirit and scope of the invention, as defined in the appended claims.

For example, the present invention should not be limited by software/program, computing environment, or specific computing hardware.

The above enhancements are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of database programming.

The invention claimed is:

1. A computer-based method of finding similar items labeled in a taxonomy comprising the steps of:
   determining a label $L_A$ representing a set of concepts that a target object T and a candidate object C have in common, said target object T and candidate object C part of a taxonomy structure as acyclic graphs wherein at least one child class has multiple parents;
   determining information content $I(L_A)$ of label $L_A$ representing said set of common concepts;
   combining individual information content $I(L_T)$ and $I(L_C)$, where $I(L_T)$ and $I(L_C)$ represent individual information content of labels of target object and candidate object, respectively,
   finding similarity between said target object and said candidate object in said taxonomy as a function of $I(L_A)$ and $I(L_T)+I(L_C)$, and
   wherein said information content $I(L_A)$, $I(L_T)$, and $I(L_C)$ are functions of inclusion probabilities $p(L_A)$, $p(L_T)$, and $p(L_C)$, respectively, said inclusion probability of label L defined as the probability that an ancestor graph of label L of an object o chosen at random from a corpus $\vartheta$ contains L, and said similarity between said target object T and said candidate object C is found based on the following mathematical function:

$$sim(T, C) = \frac{2I(L_A)}{I(L_T) + I(L_C)},$$

and said inclusion probability is given by:

$p_i(L) = p(L \subseteq \text{Terms}(\text{Anc}(o)))$.

2. A computer-based method of finding similar items labeled in a taxonomy, as per claim 1, wherein said method is implemented in conjunction with a object relational-database.

3. A computer-based method of finding similar items labeled in a taxonomy, as per claim 2, wherein said database additionally has user-defined types and functions allowing efficient implementation of said computer-based method.

4. A computer-based method of finding similar items labeled in a taxonomy, as per claim 1, wherein said method is iteratively performed for more than one candidate objects, with said more than one candidate objects being ranked in order of similarity.

5. A computer-based method of finding similar items labeled in a taxonomy, as per claim 4, wherein said method further utilizes pre-computed ancestor graphs for candidate objects labels and each individual term in a taxonomy.

6. An article of manufacture comprising a computer storage medium storing computer executable instructions for finding similar items labeled in a taxonomy, said medium comprising:
   computer readable program code determining a label $L_A$ representing a set of concepts that a target object T and a candidate object C have in common, said target object T and candidate object C part of a taxonomy structure as acyclic graphs wherein at least one child class has multiple parents;
   computer readable program code determining information content $I(L_A)$ of label $L_A$ representing said set of common concepts;
   computer readable program code combining individual information content $I(L_T)$ and $I(L_C)$, where $I(L_T)$ and $I(L_C)$ represent individual information content of labels of target object and candidate object, respectively, and
   computer readable program code finding similarity between said target object and said candidate object in said taxonomy as a function of $I(L_A)$ and $I(L_T)+I(L_C)$,
   wherein said information content $I(L_A)$, $I(L_T)$, and $I(L_C)$ are functions of inclusion probabilities $p(L_A)$, $p(L_T)$, and $p(L_C)$, respectively, said inclusion probability of label L defined as the probability that an ancestor graph of label L of an object o chosen at random from a corpus $\vartheta$ contains L, and said similarity between said target object T and said candidate object C is found based on the following mathematical function:

$$sim(T, C) = \frac{2I(L_A)}{I(L_T) + I(L_C)},$$

and said inclusion probability is given by:

$p_i(L) = p(L \subseteq \text{Terms}(\text{Anc}(o)))$.

7. A computer-based method of finding similar items labeled in a taxonomy comprising the steps of:
   determining a label $L_A$ representing a set of concepts that a target object T and a candidate object C have in common, said target object T and candidate object C part of a taxonomy structure as acyclic graphs wherein at least one child class has multiple parents;
   determining information content $I(L_A)$ of label $L_A$ representing said set of common concepts;
   combining individual information content $I(L_T)$ and $I(L_A)$, where $I(L_T)$ represent information content of label of target object;
   finding similarity between said target object and said candidate object in said taxonomy as a function of $I(L_A)$ and $I(L_T)+I(L_A)$, and
   wherein said similarity is equal to 1 if and only if object C is substitutable for object T, and said information content $I(L_A)$, $I(L_T)$, and $I(L_C)$ are functions of inclusion probabilities $p(L_A)$, $p(L_T)$, and $p(L_C)$, respectively, said inclusion probability of label L defined as the probability that an ancestor graph of label L of an object o chosen at random from a corpus $\vartheta$ contains L, and said similarity between said target object T and said candidate object C is found based on the following mathematical function:

$$sim_G(T, C) = \frac{2I(L_A)}{I(L_T) + I(L_A)},$$

and said inclusion probability is given by:

$$p_i(L)=p(L \subseteq \mathrm{Terms}(\mathrm{Anc}(o))).$$

8. A computer-based method of finding similar items labeled in a taxonomy, as per claim 7, wherein said method is implemented in conjunction with a object relational-database.

9. A computer-based method of finding similar items labeled in a taxonomy, as per claim 8, wherein said database additionally has user-defined types and functions allowing efficient implementation of said computer-based method.

10. A computer-based method of finding similar items labeled in a taxonomy, as per claim 7, wherein said method is iteratively performed for more than one candidate objects, with said more than one candidate objects being ranked in order of similarity.

11. A computer-based method of finding similar items labeled in a taxonomy, as per claim 10, wherein said method further utilizes pre-computed ancestor graphs for candidate objects labels and each individual term in a taxonomy.

12. An article of manufacture comprising a computer storage medium storing computer executable instructions for finding similar items labeled in a taxonomy, said medium comprising:

computer readable program code determining a label $L_A$ representing a set of concepts that a target object T and a candidate object C have in common, said target object T and candidate object C part of a taxonomy structure as acyclic graphs wherein at least one child class has multiple parents;

computer readable program code determining information content $I(L_A)$ of label $L_A$ representing said set of common concepts;

computer readable program code combining individual information content $I(L_T)$ and $I(L_A)$, where $I(L_T)$ represent information content of label of target object;

computer readable program code finding similarity between said target object and said candidate object in said taxonomy as a function of $I(L_A)$ and $I(L_T)+I(L_A)$, and wherein said similarity is equal to 1 if and only if object C is substitutable for object T and said information content $I(L_A)$, $I(L_T)$, and $I(L_C)$ are functions of inclusion probabilities $p(L_A)$, $p(L_T)$, and $p(L_C)$, respectively, said inclusion probability of label L defined as the probability that an ancestor graph of label L of an object o chosen at random from a corpus $\vartheta$ contains L, and said similarity between said target object T and said candidate object C is found based on the following mathematical function:

$$sim_G(T, C) = \frac{2I(L_A)}{I(L_T) + I(L_A)},$$

and said inclusion probability is given by:

$$p_i(L)=p(L \subseteq \mathrm{Terms}(\mathrm{Anc}(o))).$$

* * * * *